(12) United States Patent
Liu et al.

(10) Patent No.: US 8,448,064 B2
(45) Date of Patent: May 21, 2013

(54) WEBPAGE DESIGN SYSTEM

(75) Inventors: Yao-Hua Liu, Shenzhen (CN);
Shih-Fang Wong, New Taipei (TW);
Xin Lu, Shenzhen (CN); Chao Yang,
Shenzhen (CN); Wei Tang, Shenzhen
(CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/110,875

(22) Filed: May 18, 2011

(65) Prior Publication Data
US 2012/0166932 A1 Jun. 28, 2012

(30) Foreign Application Priority Data
Dec. 25, 2010 (CN) .......................... 2010 1 0605381

(51) Int. Cl.
*G06F 17/00* (2006.01)
(52) U.S. Cl.
USPC .......................................................... 715/234
(58) Field of Classification Search
USPC .......................................................... 715/234
See application file for complete search history.

(56) References Cited

U.S. PATENT DOCUMENTS

| | | | |
|---|---|---|---|
| 6,625,803 B1 * | 9/2003 | Massena et al. | 717/100 |
| 7,546,576 B2 * | 6/2009 | Egli | 717/106 |
| 7,661,109 B2 * | 2/2010 | Lindhorst et al. | 719/316 |
| 2002/0023111 A1 * | 2/2002 | Arora et al. | 707/513 |
| 2002/0026447 A1 * | 2/2002 | Matsutsuka et al. | 707/103 Y |
| 2008/0148162 A1 * | 6/2008 | Hsiao | 715/760 |
| 2010/0037168 A1 * | 2/2010 | Thayne et al. | 715/769 |

OTHER PUBLICATIONS

Component Source, http://web.archive.org/web/20080907062307/http://www.componentsource.com/Store/ActiveXLibrary_R1548456/esd_setup.asp, Sep. 7, 2008, pp. 1-6.*
Tyler, Denise; Microsoft FrontPage97; 1997; Sams.net Publishing; pp. 117, 590-591, 730.*

* cited by examiner

*Primary Examiner* — Stephen Hong
*Assistant Examiner* — James G Pohlman
(74) *Attorney, Agent, or Firm* — Altis Law Group, Inc.

(57) ABSTRACT

The present disclosure provides a webpage design system including a storage and a processor. The storage stores a number of ActiveX controls, a number of ActiveX control description files each describing a corresponding one ActiveX control, and a number of modules. The modules include instructions executable by the processor to provide a webpage interface for a user to design a webpage. The webpage interface includes an ActiveX control option for the user to select at least one desired ActiveX control. The modules further include instructions executable by the processor to position the selected ActiveX control in a designed webpage under construction, provide a search interface for the user to input a description of a desired function, and search in the ActiveX control description files according to the description to determine whether at least one ActiveX control having the desired function exists in the storage.

3 Claims, 1 Drawing Sheet

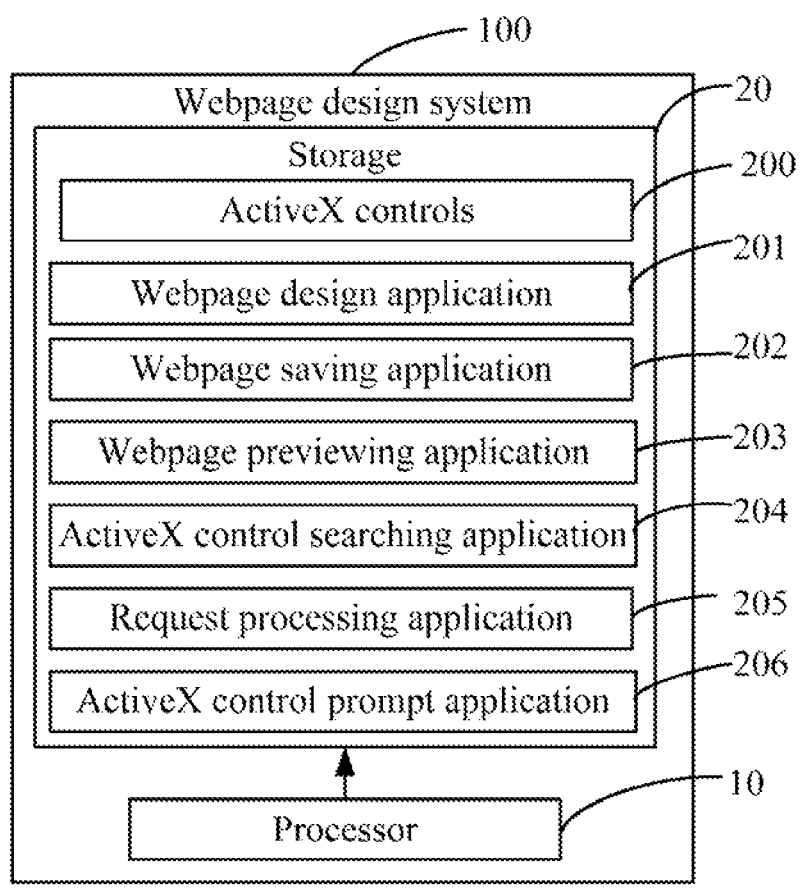

WEBPAGE DESIGN SYSTEM

BACKGROUND

1. Technical Field

The present disclosure relates to a webpage design system.

2. Description of Related Art

Currently, webpages are designed in a variety of ways. In some instances, a user designs a webpage through the use of a text editor. In such instances, the user can directly enter code and design the webpage by using a programming language, such as HTML, XHTML, PHP, JAVASCRIPT, and/or another similar markup or script language. In other instances, the user utilizes webpage editing software, such as an HTML editor, to design a webpage. In such instances, the user can design a webpage by directly entering content into the editor. However, current methods of webpage design have shortcomings. By way of example, most, if not all, webpage design methods require that a user who designs the webpage has at least some understanding of design coding and programming languages. This requirement prevents some people from designing a webpage well or at all.

BRIEF DESCRIPTION OF THE DRAWINGS

The components of the drawing are not necessarily drawn to scale, the emphasis instead being placed upon clearly illustrating the principles of a webpage design system.

The drawing is a block diagram of a webpage design system in accordance with an exemplary embodiment.

DETAILED DESCRIPTION

Referring to the drawing, a webpage design system 100 includes a processor 10 and a storage 20. The processor 10 executes/runs various software components in the storage 20 to perform various functions for the system 100.

The storage 20 stores a number of ActiveX controls 200. The ActiveX controls 200 may include a pull-down menu ActiveX control 200, a file uploading ActiveX control 200, and so on. The storage 20 further stores a number of ActiveX control description files each describing a corresponding one of the stored ActiveX controls 200. The storage 20 further stores a webpage design application 201, a webpage saving application 202, a webpage previewing application 203, an ActiveX control searching application 204, a request processing application 205, and an ActiveX control prompt application 206.

The webpage design application 201 includes various software components and/or set of instructions, which may be implemented by the processor 10 for providing a webpage interface for a user to design a webpage. The webpage interface includes an ActiveX control option for the user to select one or more desired ActiveX controls 200 from the storage 20. The webpage design application 201 further includes various software components and/or set of instructions, which may be implemented by the processor 10 for positioning the one or more selected ActiveX controls 200 in a webpage under construction in response to user input. The webpage saving application 202 includes various software components and/or set of instructions, which may be implemented by the processor 10 for saving the webpage in response to user input. The webpage previewing application 203 includes various software components and/or set of instructions, which may be implemented by the processor 10 for previewing the webpage in response to user input.

The ActiveX control searching application 204 includes various software components and/or set of instructions, which may be implemented by the processor 10 for providing a search interface for the user to input a description of a desired function. The ActiveX control searching application 204 further includes various software components and/or set of instructions, which may be implemented by the processor 10 for searching in the ActiveX control description files according to the input description to determine whether at least one ActiveX control 200 having the desired function exists in the storage 20. With the ActiveX control searching application 204, the user can quickly find the desired ActiveX controls 200.

The request processing application 205 includes various software components and/or set of instructions, which may be implemented by the processor 10 for providing a request interface for the user to input a description of a desired function. The request processing application 205 further includes various software components and/or set of instructions, which may be implemented by the processor 10 for transmitting the function description input through the request interface to a service provider of the system 100 through the Internet to request the service provider to design one or more ActiveX controls 200 according to the input description. In this embodiment, the ActiveX control searching application 204 is implemented by the processor 10 to display the request interface when no ActiveX control 200 having the desired function corresponding to the function description input through the search interface is found in the storage 20. The ActiveX control prompt application 206 includes various software components and/or set of instructions, which may be implemented by the processor 10 for generating an ActiveX control prompt when a new ActiveX control 200 is added to the storage 20.

In this embodiment, no matter whether the user is professional or not, the user can design a dynamic webpage quickly and easily by selecting desired ActiveX controls 200 from the storage 20. Furthermore, if some ActiveX control 200 having a desired function does not exist in the storage 20, the user can input a description of the desired function to request the service provider of the system 100 to design one or more needed ActiveX controls 200.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A webpage design system, comprising:
   a storage storing a plurality of ActiveX controls, a plurality of ActiveX control description files each describing a corresponding one of the plurality of the ActiveX controls, and a plurality of modules; and
   a processor to execute the plurality of modules;
   wherein the plurality of modules comprises instructions executable by the processor to:
      provide a webpage interface for a user to design a webpage, the webpage interface comprising an ActiveX control option for the user to select at least one desired ActiveX control from the plurality of the ActiveX controls;
      position the at least one selected ActiveX control in a webpage under construction in response to user input;
      provide a search interface for the user to input a description of a desired function; and search in the ActiveX control description files according to the description of the desired function input through the search interface to determine whether at least one ActiveX control having the desired function corresponding to the description input through the search interface exists in the storage;

provide a request interface for the user to input a description of a desired function, when no ActiveX control having the described function corresponding to the description of the desired function input through the search interface exists in the storage; and transmit the description of desired function input through the request interface to a service provider of the webpage design system to request the service provider to design one or more ActiveX controls according to the description of the desired function input through the request interface.

2. The webpage system as described in claim 1, wherein the plurality of modules further comprises instructions executable by the processor to preview the designed webpage.

3. The webpage system as described in claim 1, wherein the plurality of modules further comprises instructions executable by the processor to generate an ActiveX control prompt when a new ActiveX control is added to the storage.

* * * * *